(12) United States Patent
Dayal (10) Patent No.: US 9,530,299 B2
(45) Date of Patent: Dec. 27, 2016

(54) METHODS AND APPARATUSES FOR ASSISTING A VISUALLY-IMPAIRED USER

(71) Applicant: Toyota Motor Engineering & Manufacturing North America, Inc., Erlanger, KY (US)

(72) Inventor: Rajiv Dayal, Santa Clara, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/636,813

(22) Filed: Mar. 3, 2015

(65) Prior Publication Data

US 2016/0260309 A1   Sep. 8, 2016

(51) Int. Cl.
*G08B 23/00* (2006.01)
*G08B 21/04* (2006.01)
*G09B 21/00* (2006.01)

(52) U.S. Cl.
CPC ......... *G08B 21/0446* (2013.01); *G09B 21/001* (2013.01)

(58) Field of Classification Search
CPC ... A61B 5/11; G06F 19/3406; G08B 21/0446; G09B 21/001
USPC ........... 340/573.7, 539.13; 434/247; 600/595
See application file for complete search history.

(56) References Cited

U.S. PATENT DOCUMENTS

| | | | |
|---|---|---|---|
| 6,325,508 B1* | 12/2001 | Decreton | G02C 7/02 351/158 |
| 7,792,328 B2* | 9/2010 | Albertson | B60W 40/09 340/576 |
| 8,366,641 B2 | 2/2013 | Wang et al. | |
| 2006/0154220 A1* | 7/2006 | Toniolo | G09B 19/0015 434/250 |
| 2006/0259472 A1* | 11/2006 | MacClellan | G06Q 10/06 707/999.003 |
| 2013/0013087 A1 | 1/2013 | Aliakseyeu et al. | |
| 2013/0035742 A1* | 2/2013 | Talbot | G06K 9/00228 607/54 |
| 2013/0265169 A1 | 10/2013 | Mates | |

(Continued)

FOREIGN PATENT DOCUMENTS

| | | |
|---|---|---|
| CN | 103267524 A | 8/2013 |
| JP | 2013047709 A | 3/2013 |

(Continued)

OTHER PUBLICATIONS

Ramiro Velázquez; Wearable Assistive Devices for the Blind; Wearable and Autonomous Biomedical Devices and Systems for Smart Environment: Issues and Characterization; Accessed Nov. 19, 2014; http://www.robotica-up.org/PDF/Wearable4Blind.pdf.

(Continued)

*Primary Examiner* — Thomas Mullen
(74) *Attorney, Agent, or Firm* — Dinsmore & Shohl LLP (57) ABSTRACT

In one embodiment, a method for assisting a visually-impaired user is provided. The method includes determining, based upon an input from at least one sensor, a body position or posture of a user. The method also compares, using a processor, the determined body position to a plurality of body positions or postures to identify whether the determined body position or posture is acceptable. The method further includes providing a feedback signal indicating a change in body position or posture to assist the visually impaired user.

20 Claims, 5 Drawing Sheets

(56) References Cited

U.S. PATENT DOCUMENTS

2015/0199918 A1* 7/2015 Jagannathan ........... G06F 3/017
340/4.12

FOREIGN PATENT DOCUMENTS

| WO | 2004008427 A1 | 1/2004 |
| WO | 2013029097 A2 | 3/2013 |
| WO | 2014015378 A1 | 1/2014 |
| WO | 2014066516 A1 | 5/2014 |
| WO | 2014125448 A1 | 8/2014 |

OTHER PUBLICATIONS

EIT ICT Labs; Pose Track; Jul. 2014; http://www.eitictlabs.eu/fileadmin/files/2014/news-items/Winners_Finalists_Idea-Challenge.pdf.

* cited by examiner

METHODS AND APPARATUSES FOR ASSISTING A VISUALLY-IMPAIRED USER

TECHNICAL FIELD

The present specification generally relates to apparatuses and methods for assisting visually-impaired users and, more specifically, apparatuses and method for assisting visually-impaired users by providing feedback related to one or more body position.

BACKGROUND

A visually-impaired person, such as a blind person, may have issues with body position or posture compared to conventional societal norms because visually-impaired persons cannot see body language and thus do not perceive typical conditions or positions. A visually-impaired person, for example, may fail to face and/or look toward another person speaking to him or her. Similarly, a blind person may have posture issues that convey a lack of self-confidence, such as a lowered head without realizing what the posture may be implying to other people.

Accordingly, a need exists for alternative apparatuses and methods for assisting visually-impaired users by providing feedback related to one or more body position.

SUMMARY

In one embodiment, a method for assisting a visually-impaired user is provided. The method includes determining, based upon an input from at least one sensor, a body position or posture of a user. The method also compares, using a processor, the determined body position to a plurality of body positions or postures to identify whether the determined body position or posture is acceptable. The method further includes providing a feedback signal indicating a change in body position or posture to assist the visually impaired user.

In another embodiment, an apparatus is provided including a sensor adapted to detect information related to a body position or posture of a user of the apparatus; and a controller adapted to provide a feedback signal to the user when the body position is determined to comprise an unacceptable body position or posture. The controller is adapted to determine, based upon an input from the sensor, a body position or posture of the user. The controller also compares the determined body position to a plurality of body positions or postures to identify whether the determined body position or posture is acceptable. The controller also provides a feedback signal indicating a change in body position or posture to the user.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Implementations of the present disclosure are directed to apparatuses, methods and computer program products for assisting a visually-impaired person by providing feedback to the person based upon one or more inputs from sensors. Sensors, such as cameras, inertial measurement units (IMUs), microphones, acceleration and orientation sensors, detect the person's body position and/or posture, which in some implementations may include gestures, behavior or the like. The apparatuses, methods and computer program products provide feedback to the visually-impaired person to enable the person to alter, change or correct the person's body position and/or posture. In one implementation, for example, a wearable visually-impaired device is configured as a wearable form factor, such as a necklace, bracelet, torso strap, arm band, head band, eyeglasses, and detects a body position of the wearer using one or more cameras, IMUs, microphones, acceleration, orientation and/or other sensors. If the device detects that the wearer's body position is undesirable, it provides feedback to the user including assistance to correct his or her posture (e.g., tilt head up, turn slightly to the right/left, etc.).

Figure 1:
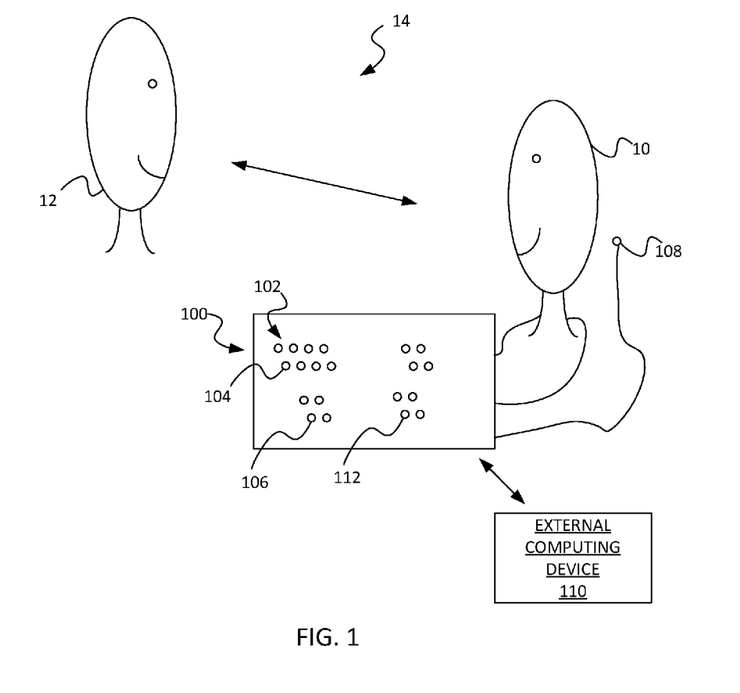
FIG. 1 depicts a person wearing an example apparatus for assisting a visually-impaired person according to one or more embodiments shown and described herein.

Referring initially to FIG. 1, a device 100 for assisting a visually-impaired person 10 according to one exemplary embodiment is illustrated. In this implementation, for example, the device 100 includes a wearable apparatus, such as the necklace form factor shown in FIG. 1. The device 100 includes one or more sensors 102 that are adapted to detect one or more body position and/or posture of the person 10. In the example shown in FIG. 1, for example, the visually-impaired person is talking with another person 12 and the visually-impaired person 10 is shown with his or her head down and looking away from the other person 12.

In this example, the one or more sensors 102 of the device 100 detect at least one body position and/or posture and provide feedback to the wearer 10 if that body position and/or posture is determined to fall outside of a desirable body position and/or posture. In this implementation the one or more sensors may include one or more microphones 104 or other sound sensors adapted to detect sound from the person 12 speaking and determine a direction of the person 12. The device 100 further includes one or more camera sensors 106 adapted to detect one or more body position and/or posture of the wearer 10. In this implementation, the device 100 is adapted to use image processing to detect the wearer's body position and/or posture, such as the body orientation and/or head position of the wearer 10 shown in FIG. 1.

The device 100 is further adapted to determine a setting based on inputs received at the one or more sensors 102. For example, the device 100 is adapted to determine from the setting 14 shown in FIG. 1 that the wearer 10 is talking to another person 12 and that the wearer is facing a direction away from the other person 12 with his or her head looking in a generally downward orientation.

The device 100 is adapted to compare the detected body position and/or posture of the wearer 10 to one or more socially accepted norms, such as from a look-up table or other data structure. If the wearer's body position and/or posture are determined to fall outside a range of socially acceptable body positions and/or postures, the device 100 is further adapted to provide one or more feedback signals/alerts to the wearer. The device 100 may, for example, include one or more notification elements 108, such as but not limited to a speaker, vibrator, buzzer, LED or the like. The feedback signal/alert may, for example, include one or more of an audible sound, a vibration or a communication with a remote computing device such as a smartphone, tablet, smart watch or the like. In one implementation, for example, the device 100 may provide an audible alert, such as a recorded or computer-generated voice message with instructions, such as "face speaker and lift head." Where the wearer 10 has an earphone 108, for example, the instruction message may be played over the earphone so that the instruction may be conveyed without the other person 12 hearing the instruction. The earphone 108, for example, may be directly controlled by the device 100 and coupled via a wired or wireless connection (e.g., Bluetooth) or may be controlled via an external computing device, such as a smartphone 110, a tablet, a smart watch or the like.

Figure 2:
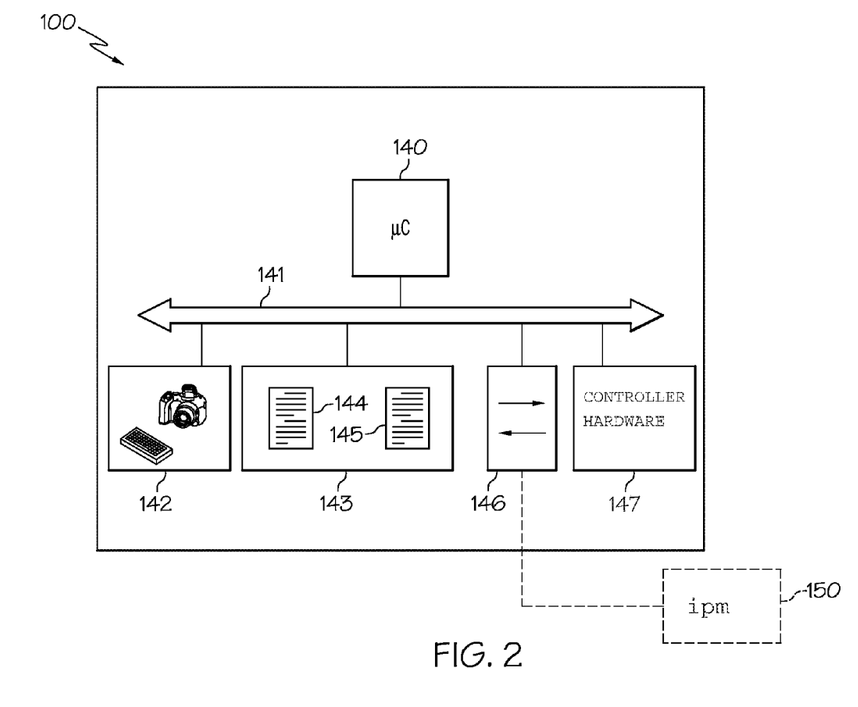
FIG. 2 depicts a schematic illustration of an example apparatus for assisting a visually-impaired person components according to one or more embodiments shown and described herein.

Referring now to FIG. 2, additional components of an exemplary device 100 are illustrated. More particularly, FIG. 2 depicts a device 100 and an intelligent sensor and notification module 150 (embodied as a separate computing device, an internal component of the device 100, and/or a computer-program product comprising non-transitory computer-readable medium) for detecting a user's body position and/or posture and, if desired, providing a feedback notification suggesting a change to the user's body position and/or posture, such as to conform with a societal norm. The intelligent sensor and notification module 150 of the device 100 may be embodied as hardware, software, and/or firmware, according to implementations shown and described herein. It is noted that the computer-program products and methods for assisting a visually-impaired user may be executed by a computing device (e.g. a smartphone or smart watch) that is external to the device 100 in some implementations. For example, a general purpose computer (not shown) may have computer-executable instructions for detecting a user's body position and/or posture based upon one or more sensor signals and compare that body position and/or posture to a socially acceptable or preferred body position and/or posture and determine whether to provide a feedback signal to the user identifying a change in the user's body position and/or posture. The selected body position and/or posture changes that satisfy requirements of the selection criteria may then be sent to the device 100.

The example device 100 illustrated in FIG. 2 comprises a processor 140, input/output hardware 142, a non-transitory computer-readable medium 143 (which may store body position/posture recognition data/logic 144, and body position/posture data/logic 145, for example), network interface hardware 146, and sensor and alert element controller hardware 147 (e.g., hardware for controlling one or more sensor 102 and/or notification element 112) to sense a user's body position/posture and provide a notification to the user. It is noted that the sensor and alert controller hardware 147 may also include associated software to control other various elements of the device 100, such as, but not limited to, input/output hardware for interacting with the device.

The non-transitory computer-readable medium component 143 (also referred to in particular illustrative implementations as a memory component 143) may be configured as volatile and/or nonvolatile computer readable medium and, as such, may include random access memory (including SRAM, DRAM, and/or other types of random access memory), flash memory, registers, compact discs (CD), digital versatile discs (DVD), magnetic disks, and/or other types of storage components. Additionally, the memory component 143 may be configured to store, among other things, body position/posture recognition data/logic 144, and body position/posture data/logic 145 and data storage such as a look up table or other data storage structure (e.g., a listing of acceptable and/or unacceptable body positions and/or postures). A local interface 141 is also included in FIG. 2 and may be implemented as a bus or other interface to facilitate communication among the components of the device 100 or the computing device.

The processor 140 may include any processing component configured to receive and execute instructions (such as from the memory component 143). The input/output hardware 142 may include any hardware and/or software for providing input to the device 100 (or computing device), such as, without limitation, a keyboard, mouse, camera, sensor (e.g., light sensor), microphone, speaker, touchscreen, and/or other device for receiving, sending, and/or presenting data. The network interface hardware 146 may include any wired or wireless networking hardware, such as a modem, LAN port, wireless fidelity (Wi-Fi) card, WiMax card, Bluetooth, mobile communications hardware, and/or other hardware for communicating with other networks and/or devices.

It should be understood that the memory component 143 may reside local to and/or remote from the device 100 and may be configured to store one or more pieces of data for access by the device 100 and/or other components. It should also be understood that the components illustrated in FIG. 2 are merely exemplary and are not intended to limit the scope of this disclosure. More specifically, while the components in FIG. 2 are illustrated as residing within the device 100, this is a non-limiting example. In some implementations, one or more of the components may reside external to the device 100, such as within a computing device that is communicatively coupled to one or more devices.

FIG. 2 also depicts an intelligent sensor and notification module 150 that is configured to determine a user's body position and/or posture based upon one or more sensor inputs of the device 100, compare the determined body position/posture to possible acceptable and/or unacceptable body positions and/or postures (e.g., stored in a look up table, database or other data structure) and, if desired, provide a feedback notification to the user including a suggested alteration to the user's body position and/or posture in order to conform to one or more societal norms.

The identification of acceptable or unacceptable body positions and/or postures may, for example, be a list of setting-independent positions and/or postures or may be identified in a setting or context (e.g., during a conversation or walking in public). Thus, in various implementations the intelligent sensor and notification module 150 (and/or other software, hardware and/or firmware) of the device 100 may further determine a setting or context in which the user is acting. For example, by detecting an interactive conversation between the user and another person, the device 100 may determine that the user is participating in a conversation with the other person and compare the user's body position and/or postures to acceptable or preferred body positions and/or postures based upon the determination that the user and the other person are participating in a conversation. Similarly, the device 100 may determine that the user is walking around other people (e.g., through a crowd) and determine whether to recommend one or more body position and/or posture changes to the user (e.g., hold your head up) that may make the user appear more confident or otherwise provide a positive image of the user to others.

The intelligent sensor and notification module 150 is shown as external to the device 100 in FIG. 2, and may reside in an external computing device, such as a general purpose or application specific computer (e.g., a smartphone, tablet, smart watch or the like). However, it should be understood that all, some, or none of the components, either software or hardware, of the intelligent sensor and notification module 150 may be provided within the device 100. In one implementation, for example, detection of a user's body position and/or posture, identification of a setting or context in which the user is participating, comparison to one or more societally acceptable body positions and/or postures and/or other functionalities may be performed off-line and remotely from the device 100 by a computing device such that only notifications identifying one or more changes to the user's body position and/or posture satisfying the requirements of the intelligent sensor and notification module 150 described herein are provided to the device 100 for use in assisting the user. Further, identification of one or more changes to the user's body position and/or posture within the intelligent sensor and notification module 150 may also be performed off-line by an external computing device and provided to the device 100. Components and methodologies of the intelligent sensor and notification module 150 are described in detail below.

Figure 3:
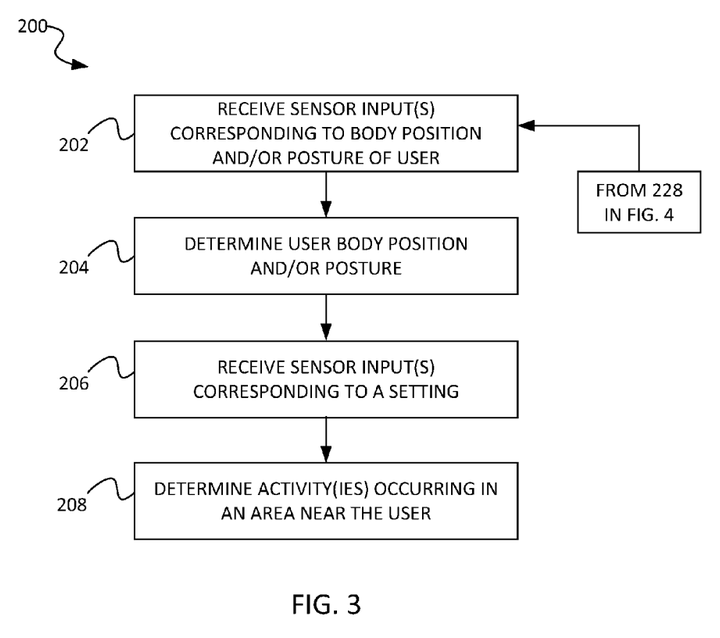
FIG. 3 depicts a flowchart of an example process of determining a user's body position and/or posture and a setting in which a user is participating according to one or more embodiments shown and described herein.

FIG. 3 depicts a flowchart of an example process 200 of determining a user's body position and/or posture and a setting in which a user is participating according to one or more embodiments shown and described herein. In operation 202, a processor and/or controller of the device receive one or more sensor inputs corresponding to a body position and/or posture of user of the device (e.g., a wearer of the device). In various implementations contemplated herein, the sensors may include one or more of a number of different types of sensors that are adapted to sense information related to a body position and/or posture of the user. For example, sensors such as a still camera, video camera, IMU, microphone, an acceleration sensor, an orientation sensor or the like may be used in various implementations.

A camera may provide one or more images related to a user's body position and/or posture. A necklace or other form factor wearable device may, for example, include one or more camera sensors directed toward one or more body portions of interest (e.g., the user's head/neck, arms, legs, torso). The one or more cameras may provide one or more images corresponding to the user's body position and/or posture.

The operation of determining the user's body position and/or posture may in operation 204, for example, include using the images to detect one or more body position and/or posture (e.g., an orientation, facing direction, eyes open or closed, mouth open or closed, hair neatly groomed or the like). Various object recognition algorithms, such as a scale-invariant feature transform (SIFT) algorithm, or object recognition processes may be used. A SIFT algorithm, for example, uses computer vision technology to detect and describe local features in images. Points on an object may be extracted to provide a feature description of the object. This description, extracted from a training image, may then be used to identify an object (e.g., a body position and/or posture) when attempting to locate the object in a test image containing many other objects. Features extracted from a training image in various implementations may be detectable even under changes in image scale, noise and illumination.

Before and/or during a setting in which the user is interacting, the device may further monitor for changes in the user's body position and/or posture in operation 204 based upon one or more input signals received in operation 202. The changes in various implementations may include user movements detected by one or more sensors of the device. In one particular implementation, for example, the device recognizes one or more body positions and/or postures using a camera or other sensor (e.g., the user's head facing down, the user slouching, the user turning away from another person still speaking or the like). Changes in position and/or posture may be detected within, for example, by image recognition software or other data analysis software. Body position and/or posture changes may be detected by identifying a first body position and/or posture, and later identifying a different body position and/or posture.

Body positions and/or postures may be individually identified, and/or identified by an object class. A body position and/or posture state may be sensed over time, continuously, or at intervals. The body position and/or posture state may include a location, configuration (if appropriate), operational condition (for example a hat on or off) or other state parameter that may be appropriate. In some examples, human actions may also be detected and categorized. The use of body position and/or posture changes can be used to restrict the possible set of human actions, facilitating identification.

A pattern recognition algorithm may be used to compare user body position and/or posture changes to sets of previously observed data. Any pattern recognition algorithm may be used, such as a nearest neighbor algorithm, or algorithms well known in other fields such as genetics. In some examples, a current body position and/or posture change may be compared with all previously observed body position and/or posture change patterns. However, as the volume of stored data increases, frequent patterns may be identified. Frequent patterns may also be codified as a rule. In some examples, a body position and/or posture change may be first compared with known frequent patterns and, if appropriate, rules. If no match occurs a more extensive comparison may be made. In other examples, a looser match to previously body positions and/or postures may be used if no initial match is made.

In operation 206, a processor and/or controller of the device receive one or more sensor input sensors corresponding to a setting in which the user may be participating. In various implementations contemplated herein, the sensors may include one or more of a number of different types of sensors that are adapted to sense information related to the surroundings and interactions of the user. For example, sensors such as a still camera, a video camera, an IMU, a microphone, an acceleration sensor, an orientation sensor or the like may be used in various implementations.

As discussed above, one or more sensors (e.g., one or more cameras and/or microphones) may provide information about the setting or a context of the user's activity from which a recommended change in the user's body position and/or posture can be selected. In one implementation, for example, a camera may provide one or more images related to a user's body position and/or posture and any other people with whom the user is interacting. A microphone or other sound sensor may further provide sound information, including location or direction, to help identify if the user is talking or listening to one or more people in his or her surrounding area. In addition to one or more sensors of the device receiving information from the user, the device may further include one or more sensors (in addition to and/or overlapping with other sensors described above) adapted to collect information related to the surroundings of the user and/or other people in the area that may be interacting with the user. A necklace or other form factor wearable device may, for example, include one or more camera sensors directed away from the user to collect information from the area surrounding the user. One or more camera sensors may, for example, provide one or more images corresponding to an area surrounding the user.

The operation of determining activities occurring in an area near the user may in operation 208, for example, include using images to detect one or more other people in the area. Further, similar to identifying an activity of the user, the sensors may identify activities that other people in the area are participating in (e.g., a conversation, reading, playing a game, sleeping or the like) and whether those people might be interacting with the user. As described above, various object recognition algorithms, such as a scale-invariant feature transform (SIFT) algorithm, or object recognition processes may be used. The device may further monitor the surrounding area for changes in activities or context that may be related to an activity of the user in operation 208 based upon one or more input signals received in operation 206. The changes in various implementations may include movements of the user and/or one or more other people detected by one or more sensors of the device. In one particular implementation, for example, the device recognizes one or more body positions and/or postures using a camera or other sensor (e.g., the user's head facing down, the user slouching, the user turning away from another person still speaking, another person leaving the area, another person gesturing or pointing, or the like). Changes in position and/or posture of the user or another person may be detected within, for example, by image recognition software or other data analysis software. Body position and/or posture changes may be detected by identifying a first body position and/or posture, and later identifying a different body position and/or posture.

Body positions and/or postures of the user or another person may be individually identified, and/or identified by an object class. A body position and/or posture state may be sensed over time, continuously, or at intervals. The body position and/or posture state may include a location, configuration (if appropriate), operational condition (for example a hat on or off) or other state parameter that may be appropriate. In some examples, human actions may also be detected and categorized. The use of body position and/or posture changes can be used to restrict the possible set of human actions, facilitating identification.

A pattern recognition algorithm may be used to compare surrounding area changes or body position and/or posture changes to sets of previously observed data. Any pattern recognition algorithm may be used, such as a nearest neighbor algorithm, or algorithms well known in other fields such as genetics. In some examples, a current surrounding area or body position and/or posture change may be compared with all previously observed surrounding area and body position and/or posture change patterns. However, as the volume of stored data increases, frequent patterns may be identified. Frequent patterns may also be codified as a rule. In some examples, a surrounding area or body position and/or posture change may be first compared with known frequent patterns and, if appropriate, rules. If no match occurs a more extensive comparison may be made. In other examples, a looser match to previously detected surrounding area and body positions and/or postures may be used if no initial match is made.

Other sensors such as an IMU, a microphone, an acceleration sensor, an orientation sensor may further be used to detect information related to the body position and/or posture of the user and/or related to one or more setting or context in which the user is participating. An IMU, for example, may be used to detect the user's velocity, orientation and/or acceleration using one or more of accelerometers, gyroscopes and magnetometers. The information provided by the IMU may be used, alone or in combination with one or more other sensors may be used to provide information related to the user's body position and/or posture or a setting or context. The IMU information, for example, may indicate that the user is walking or running alongside another person or toward another person, or may provide information related to the direction or orientation of the user or the like. A microphone, for example, may be used to determine whether the user is talking, yelling or making noise, moving quickly. A microphone may also be used to determine one or more sounds related to another person or a surrounding area that may be useful in determining one or more setting or context in which the user may be participating. Acceleration and/or orientation sensors similarly may be used individually or as part of an IMU as described above. Such information from various sensors may be used to determine, alone or in combination with other sensor information, information related to the user's body position and/or posture or setting or context in which the user may be participating.

Figure 4:
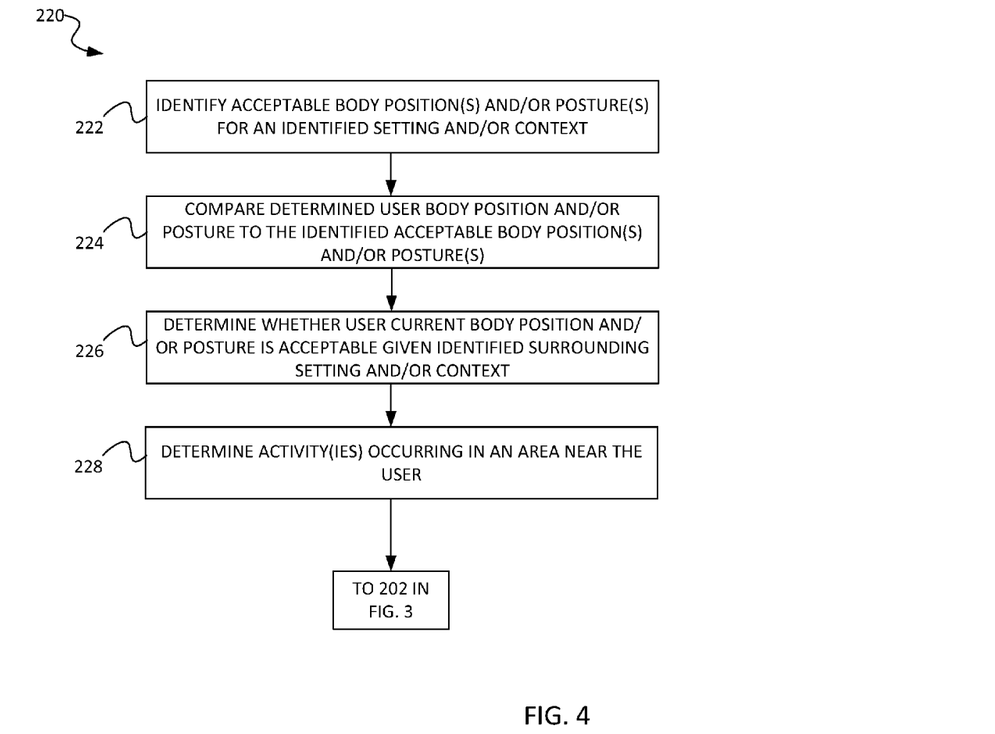
FIG. 4 depicts a flowchart of an example process of comparing a user's body position and/or posture to a plurality of socially acceptable and/or unacceptable body positions and/or postures and providing a feedback signal identifying one or more changes to the user's body position and/or posture according to one or more embodiments shown and described herein.

FIG. 4 depicts a flowchart of an example process 220 of comparing a user's body position and/or posture to a plurality of socially acceptable and/or unacceptable body positions and/or postures and providing a feedback signal identifying one or more changes to the user's body position and/or posture according to one or more embodiments shown and described herein. In operation 222, for example, the process includes identifying one or more socially acceptable and/or unacceptable body positions and/or postures for an identified setting or context in which the user has been determined to be interacting in process 200 shown in FIG. 3. Based on the identified setting or context, the device further compares the determined body position and/or posture of the user to the identified one or more socially acceptable and/or unacceptable body positions and/or postures in operation 224 and determines whether the user's current body position and/or posture is considered socially acceptable given the identified surrounding setting or context in which the user is participating in operation 226.

Although the process 200 shown in FIG. 3 and the process 220 shown in FIG. 4 show operations of identifying a setting or context in which the user is participating and identifying one or more socially acceptable and/or unacceptable behaviors based upon the determined setting or context, the device in various implementations may identify a user's body position and/or posture and provide feedback to the user regarding possible changes in his or her body position and/or posture without reference to a setting or context. For example, where the user is displaying a body position and/or posture (e.g., slouching) that might be seen as inappropriate or even harmful to the user regardless of a given setting or context, the device may provide feedback to the user including an instruction to correct his or her offending body position and/or behavior.

In the event that the user's body position and/or posture is determined to be socially acceptable (either with respect to an identified surrounding setting or context or independent thereof), the process in operation 228 returns to operation 202 in FIG. 3 and continues monitoring for further body positions and/or postures of the user as well as changes in the surrounding setting or context in which the user is participating.

In the event that the user's body position and/or posture is determined to be socially unacceptable or undesirable for whatever reason, the process 220 instead selects a feedback method, including one or more instruction on how the user may alter his or her body position and/or posture in operation 230 and provides that feedback signal to the user in operation 232.

After the feedback signal has been provided to the user in operation 232, the process 220 returns to operation 202 shown in FIG. 3 in operation 228 and continues monitoring for changes in the user's body position and/or posture as well as changes in the surrounding setting or context in which the user is participating.

Figure 5:
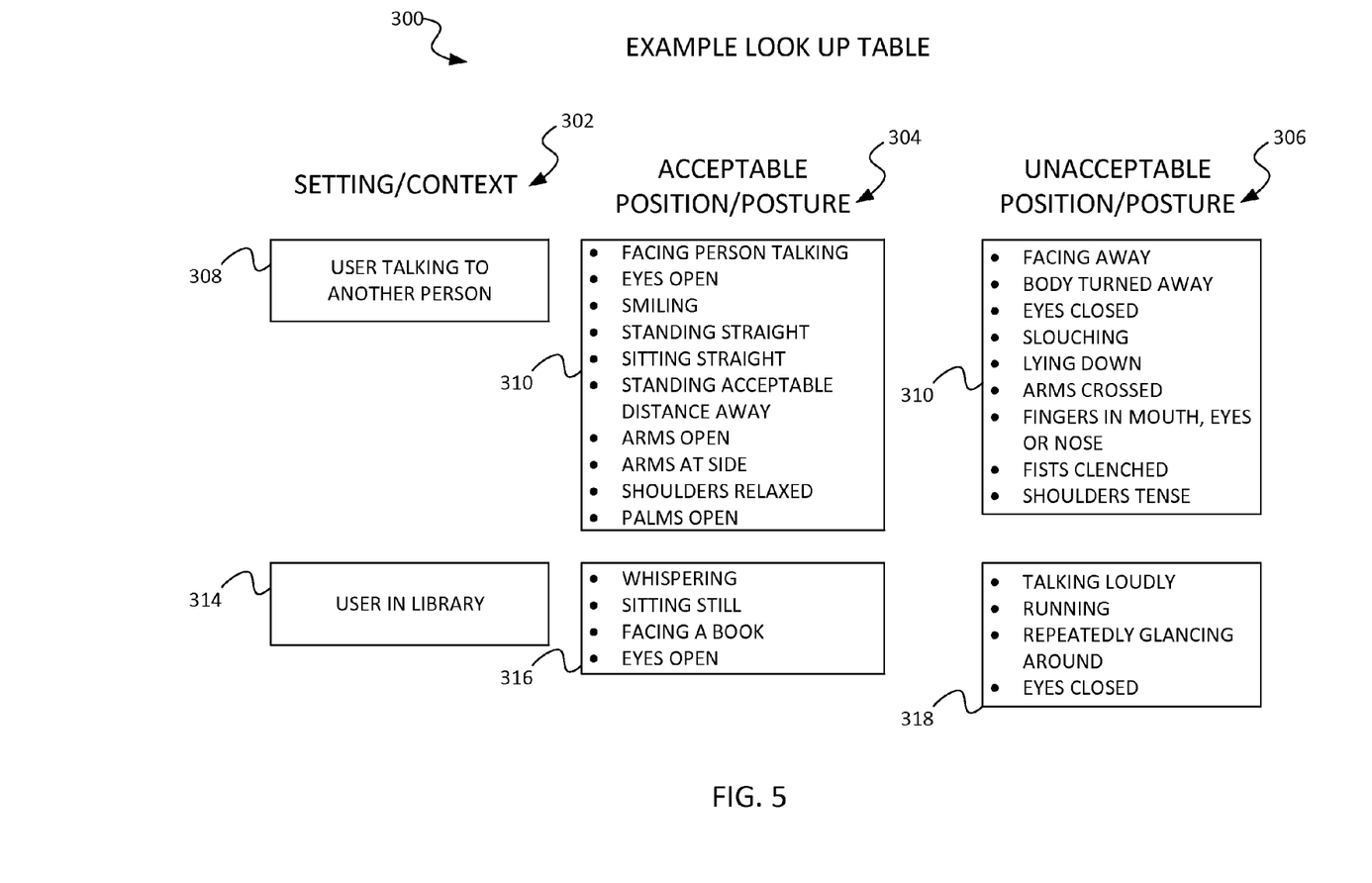
FIG. 5 depicts a schematic representation of an example look up table, database or other data store including a set of socially acceptable and/or unacceptable body positions and/or postures corresponding to one or more identified social settings or contexts according to one or more embodiments shown and described herein.

FIG. 5 depicts a schematic representation of an example look up table 300, database or other data store including a set of socially acceptable and/or unacceptable body positions and/or postures. The set of socially acceptable and/or unacceptable body positions and/or postures may be independent of or correspond to one or more identified social settings or contexts according to one or more embodiments shown and described herein.

In the look up table 300, for example, a set of settings or contexts 302 in which a user may be participating is provided corresponding to one or more socially acceptable body positions 304 and/or unacceptable body positions 306 and/or postures related to the particular identified setting or context 302 in which the user is participating.

In the example look up table 300 shown in FIG. 5, the table includes a setting or context in which the user is participating in a conversation with another person 308. The table 300 also provides a list of socially acceptable positions and/or postures 310 for the user to have during that conversation as well as a list of socially unacceptable positions and/or postures 312. Although the example of FIG. 5 shows both socially acceptable and unacceptable body positions and/or postures, the look up table may alternatively include only acceptable or unacceptable options.

In the example in which the user is participating in a conversation with another person 308, possible socially acceptable body positions and/or postures of the user may include facing the person talking, eyes open, smiling, standing straight, sitting straight, standing an acceptable distance from the other person, arms open, arms at side, shoulders relaxed, palms open or the like. Similarly, possible socially unacceptable body positions and/or postures of the user may include facing away from the other person, body turned away from the person, eyes closed, slouching, lying down, arms crossed, fingers in mouth, eyes or nose, fists clenched, shoulders tense or the like.

In another example in which the user is in a library 314, a list of socially acceptable body positions/postures 316 may include whispering, sitting still, facing a book, eyes open or the like. Similarly, a list of socially unacceptable body positions and/or postures 318 may include talking loudly, running, repeatedly glancing around, eyes closed or the like.

The settings and contexts and corresponding socially acceptable and unacceptable body positions and/or postures shown in the look up table in FIG. 5 are merely exemplary and any number of other combinations of settings or contexts and lists of socially acceptable or unacceptable body positions and/or postures are contemplated.

In one implementation, apparatuses, methods and computer program products are provided for assisting a visually-impaired person by providing feedback to the person based upon one or more inputs from sensors. Sensors, such as cameras, inertial measurement units (IMUs), microphones, acceleration and orientation sensors, detect the person's body position and/or posture, which in some implementations may include gestures, behavior or the like. The apparatuses, methods and computer program products provide feedback to the visually-impaired person to enable the person to alter, change or correct the person's body position and/or posture, which may include gestures, behaviors or the like. In one implementation, for example, a wearable visually-impaired device is configured as a wearable form factor, such as a necklace, bracelet, torso strap, arm band, head band, eyeglasses, and detects a body position of the wearer using one or more cameras, IMUs, microphones, acceleration, orientation and/or other sensors. If the device detects that the wearer's body position is undesirable, it provides feedback to the user including assistance to correct his or her posture (e.g., tilt head up, turn slightly to the right/left, etc.). By detecting undesirable body positions and/or postures, the apparatuses, method and computer program products are able to provide feedback for visually-impaired individuals that are unable to observe on their own.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for assisting a visually-impaired user comprising:
    determining, based upon an input from at least one sensor, a body position or posture of a visually-impaired user;

comparing, using a processor, the determined body position or posture to a plurality of body positions or postures to identify whether the determined body position or posture is acceptable; and providing a feedback signal indicating a change in the determined body position or posture to assist the visually-impaired user.

2. The method of claim 1 wherein the at least one sensor comprises at least one of the group of: a camera, an inertial measurement unit (IMU), a microphone, an acceleration sensor and an orientation sensor.

3. The method of claim 1 further comprising determining a setting or context relating to an activity of the user.

4. The method of claim 3 wherein the plurality of body positions or postures correspond to the determined setting or context.

5. The method of claim 3 wherein the operation of comparing is performed via a look up table.

6. The method of claim 5 wherein the look up table comprises a plurality of settings or contexts and at least one acceptable body position or posture corresponding to each of the plurality of settings or contexts.

7. The method of claim 5 wherein the look up table comprises a plurality of settings or contexts and at least one unacceptable body position or posture corresponding to each of the plurality of settings or contexts.

8. The method of claim 1 wherein the feedback signal is provided via at least one of the group comprising: a speaker, a buzzer, a vibrator and a light emitting diode (LED).

9. The method of claim 1 wherein the operation of comparing the determined body position or posture to a plurality of body positions or postures to identify whether the determined body position or posture is acceptable comprises accessing a data structure using a setting or context relating to an activity of the visually-impaired user to identify whether the determined body position or posture is acceptable.

10. The method of claim 9 wherein the data structure comprises at least one of the group of: a look up table, a database, and a relational database.

11. A wearable apparatus having a necklace form-factor comprising:
a support adapted to extend around a neck of a visually-impaired user;
a sensor coupled to the support and adapted to detect a parameter related to a body position or posture of the visually-impaired user of the apparatus and provide a corresponding output; and
a controller coupled to the support and adapted to:
determine, based upon the output from the sensor, a body position or posture of the user;
compare the determined body position or posture to a plurality of body positions or postures to identify whether the determined body position or posture is acceptable; and
provide a feedback signal indicating a change in the determined body position or posture to the user.

12. The apparatus of claim 11 wherein the sensor comprises at least one of the group of: a camera, an inertial measurement unit (IMU), a microphone, an acceleration sensor and an orientation sensor.

13. The apparatus of claim 11 wherein the controller is further adapted to determine a setting or context relating to an activity of the user.

14. The apparatus of claim 13 wherein the plurality of body positions or postures correspond to the determined setting or context.

15. The apparatus of claim 13 wherein the controller is adapted to compare the determined body position or posture via a look up table.

16. The apparatus of claim 15 wherein the look up table comprises a plurality of settings or contexts and at least one acceptable body position or posture corresponding to each of the plurality of settings or contexts.

17. The apparatus of claim 15 wherein the look up table comprises a plurality of settings or contexts and at least one unacceptable body position or posture corresponding to each of the plurality of settings or contexts.

18. The apparatus of claim 11 wherein the controller is adapted to provide the feedback signal via at least one of the group comprising: a speaker, a buzzer, a vibrator and a light emitting diode (LED).

19. The apparatus of claim 11 wherein the controller is adapted to compare the determined body position or posture to a plurality of body positions or postures to identify whether the determined body position or posture is acceptable by accessing a data structure using a setting or context relating to an activity of the visually-impaired user to identify whether the determined body position or posture is acceptable.

20. The apparatus of claim 19 wherein the data structure comprises at least one of the group of: a look up table, a database, and a relational database.

* * * * *